April 12, 1938. T. W. YEATS 2,113,780
HAND TRUCK
Filed Oct. 7, 1936
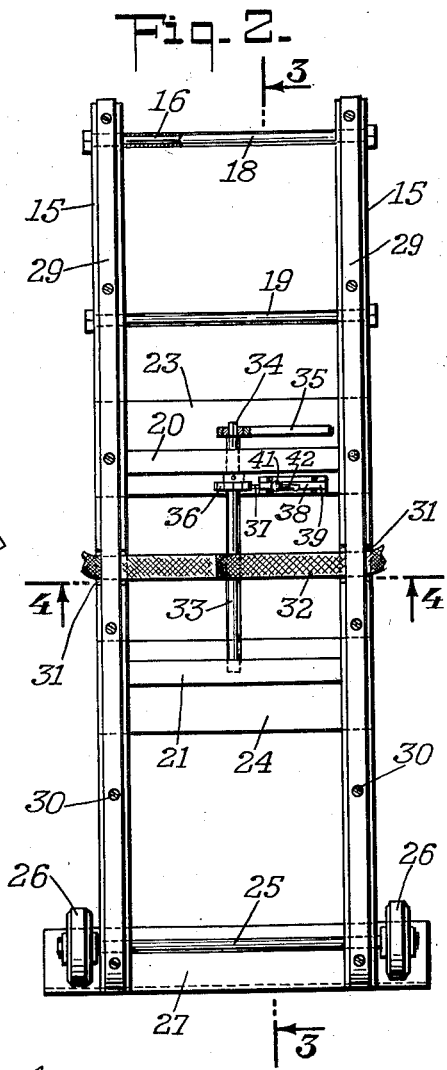
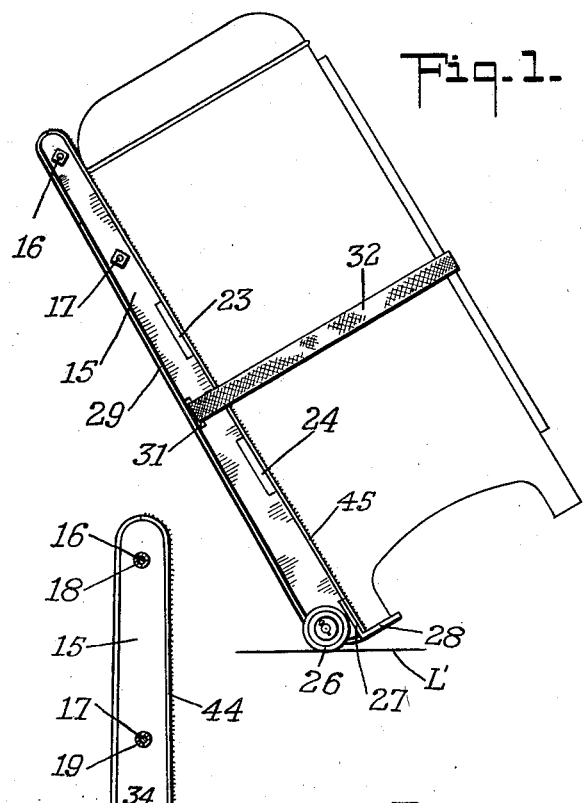
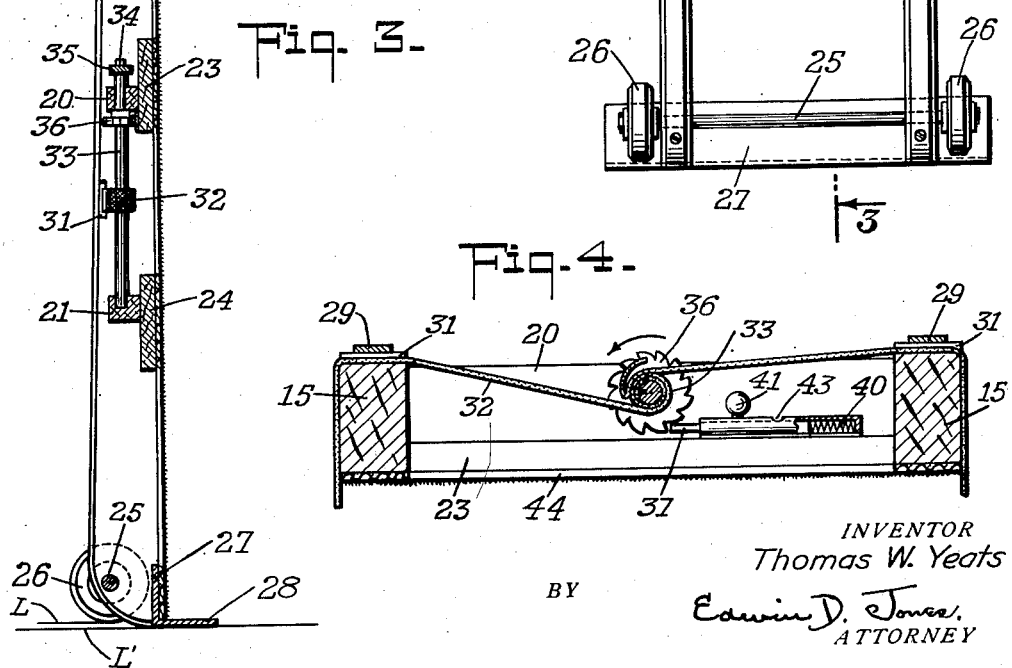
INVENTOR
Thomas W. Yeats
BY
Edwin D. Jones
ATTORNEY Patented Apr. 12, 1938

2,113,780

UNITED STATES PATENT OFFICE 2,113,780

HAND TRUCK

Thomas W. Yeats, Long Beach, Calif.

Application October 7, 1936, Serial No. 104,455

1 Claim. (Cl. 280—56)

My invention relates to hand trucks of the two-wheeled type used for transporting refrigerators, stoves or other articles of like weight and bulk.

When using the conventional hand truck great difficulty is encountered in loading any heavy and large article thereon because it is necessary to hold the article against the truck while tilting the latter from a vertical position to an inclined or rolling position. When transporting the article by the truck there is the ever present possibility of the article falling from the truck especially when ascending or descending stairways or steps of any character. Further, when unloading the article from the truck, likewise it is necessary to hold the article against the truck as the latter is brought to a vertical position to prevent the article from falling from the truck. Also, when lifting the loaded truck onto a van or other elevated support, the services of two men are required, one to slide the truck frame up the edge of the van and the other to shift the truck and its load laterally to cause the truck wheels and their supports to pass or clear the edge of the van.

It is because of these difficulties that the services of two or more men are required to load, transport and unload an article without damaging it.

It is a purpose of my invention to provide a hand truck of the two-wheeled type having simple and effective means by which any large and heavy article such as a refrigerator or stove, can by a single operator be fixedly secured to the truck to facilitate loading, transporting and unloading, all in a manner to prevent accidental displacement of the article from the truck and resultant damage thereto.

It is also a purpose of my invention to provide a hand truck in which the positioning of the wheels with relation to the truck frame and the contour of the truck frame are such that they permit the truck when loaded to be tilted with minimum physical effort to a rolling position from a vertical or non-rolling position, and to allow elevation of the loaded truck onto a moving van or other elevated support without the necessity of laterally shifting the truck in order to cause the truck wheels to pass onto the van.

I will describe only one form of hand truck embodying my invention and will then point out the novel features thereof in the claim.

In the accompanying drawing:

Fig. 1 is a view showing in side elevation one form of hand truck embodying my invention, and having in carrying position thereon a refrigerator.

Fig. 2 is a view showing the hand truck in rear elevation and in vertical position, the securing strap being broken away.

Fig. 3 is a vertical sectional view taken on the line 3—3 of Fig. 2.

Fig. 4 is an enlarged transverse sectional view taken on the line 4—4 of Fig. 2.

Referring specifically to the drawing, my invention in its present embodiment comprises a frame including two side members 15 which may be made of wood and slightly tapered in width from their lower ends upward so that their upper ends can be gripped by the hands of the operator in the manipulation of the truck. The members 15 are secured in spaced parallelism by an upper tie rod 16 and a lower tie rod 17, both surrounded between the members by pipes 18 and 19, respectively, either of which is adapted to be gripped by the operator in the manipulation of the truck.

Connecting the side members 15 beneath the pipe 19 are two beams 20 and 21 which may be made of wood and nailed or otherwise secured at their ends to the confronting sides of the members. At the forward side of the truck frame the side members 15 are formed at spaced points with two recesses in which planks or boards 23 and 24 are secured, these planks being of a length to span the side members and of a thickness to lie flush with the front edge of the members. These planks are directly in advance of the beams 20 and 21 and may be secured thereto to coact therewith in maintaining the side members rigidly spaced, and also to reinforce the beams for a purpose which will become apparent as the description proceeds.

Fixed in and extending through the lower ends of the side members 15 is an axle 25 on the opposite ends of which are journaled rubber tired wheels 26. The forward edges of the side members at the lower ends thereof may be recessed as illustrated to accommodate one portion 27 of an angle bar which is suitably secured to the side members. The other portion 28 of the angle bar extends forwardly from the side members to provide a lip positioned at right angles to the front edges of the side members at their lower ends, and upon which an article to be carried by the truck is supported.

As best shown in Fig. 3, the lower end portions of the rear edges of the side members are curved forwardly to the front edges of the members so that the lip 28 is at a tangent thereto. In relation to these curved edges the axle 25 is positioned in the side members to support the wheels 26 so that their lowermost points are in a plane slightly above the plane of the lip 28 when the latter is in horizontal position, such planes being illustrated by the lines L and L' in Fig. 3. Also, the mounting of the wheels is such that their vertical transverse axes are in advance of the straight portions of the rear edges of the side members and to the rear of the lower ends of the curved portions of such edges. The purpose of this particular arrangement of wheels, lip, and frame edges, will be described hereinafter.

The rear edges of the side members 15 are protected against wear by metal strips 29 secured to the side members by screws 30 and co-extensive in length therewith. Substantially medially of the ends of the side members recesses 31 are formed in the rear edges thereof, and these recesses are spanned by the strips 29 to, in effect, form slots through which a strap 32 is extended.

As best shown in Fig. 3, a shaft 33 is journaled at its lower end in the lower beam 21, while its other end is journaled in and extends through the upper beam 20. The upper end of the shaft is squared, as indicated at 34 to receive a ratchet wrench 35 by which the shaft can be rotated in either direction. This shaft in effect forms a reel, and as shown in Fig. 4, one end of the strap 32 is riveted or otherwise secured to the shaft 33, while its other end is normally free to permit the extension of the strap around any article to be carried by the truck and subsequently folded between the convolutions of the fixed end of the strap as wound on the shaft. In this manner the strap can be held in looped form at the forward side of the truck frame to extend around the article to be carried.

To permit rotation of the shaft in a direction to wind the ends of the strap thereupon and yet prevent rotation of the shaft in the opposite direction to maintain a tension on the strap and thus securely hold an article upon the truck, I provide a pawl and ratchet mechanism. This mechanism comprises a ratchet wheel 36 fixed to the shaft 33 just beneath the upper beam 20, and a pawl 37 in the form of a bolt slidable in a sleeve 38 having base plate 39 secured to the plank 23. The pawl or bolt 37 is urged by a spring 40 into an advanced position in which it engages the teeth of the wheel 36. This pawl is slidable in a sleeve 38, and in the advanced position thereof the shaft 33 is secured against rotation to prevent unwinding of the strap. By means of an arm 41 fixed to the pawl 37 and movable in a slot 42 of the sleeve 38, the pawl can be manually retracted to disengage the wheel 36 by partial rotation of the pawl to a position in which the arm engages within the recess 43 at the end of the slot.

To prevent marring of any article when in position upon the truck, the forward edges of the side members 15 as well as the planks 23 and 24 are covered with any suitable felt or other fabric 44.

In practice, to load on the truck for carrying an article such as the refrigerator shown in Fig. 1, the truck when in tilted position with the free end of the strap detached from the shaft and withdrawn from the respective slot, is advanced to the article and the latter tilted to permit the lip 28 to be extended beneath the article. By first bringing the truck to a vertical position in which the point of support of the truck frame passes from the wheels to the lip 28, the lip can be extended beneath the tilted article and the latter lowered onto the lip. The strap is now looped about the article and its free end restrained through the respective slot and then inserted between the convolutions of the secured strap end. Thus, upon rotating the shaft 33 by the wrench 35 with the pawl in advanced position, the strap is tightly drawn about the article to hold it firmly against the truck.

Once the article is secured to the truck as described, the truck can be tilted to permit rolling thereof in transporting the article to any destination and without fear of the article being displaced from the truck. By reason of the fact that the lip 28 is at a tangent to the curve defined by the lower rear edges of the side members, and the wheels at their lowermost peripheral points are only slightly above the plane of the lip, only slight rearward tilting of the truck is necessary to transfer the point of support back to the wheels. During this operation the curved rear edges of the frame members act as cams to elevate the truck and its load onto the wheels.

To unload the article from the truck, the truck frame is restored to vertical position and with it the article, so that all that is necessary to remove the article is to remove the strap therefrom and then withdraw the supporting lip from beneath the article. Manifestly the article can be placed upon the truck carried and removed therefrom by a single operator.

To raise the truck and its load from one support to a higher support such as when loading the truck onto a moving van or ascending a step or stairway, the truck is pulled upwardly over the edge of the upper support with the strips 29 sliding thereon, until the wheels 26 are reached when, by virtue of the fact that the vertical transverse axes of the wheels are forwardly of the rear edges of the side frame members, further pulling movement causes the wheels to roll over the edge of the support and onto the support. Thus is eliminated shifting of the truck and its load laterally and outwardly from the support to permit the truck wheels to pass over the support edge, as is necessary with hand trucks as previously constructed.

I claim:

A hand truck, comprising; a frame including a pair of side members having front edges and continuous and straight rear edges curved at their lower ends inwardly to the front edges; a supporting lip secured to the side members and projecting from the lower ends of the front edges of the members at a tangent to the curved ends of the rear edges; and a pair of wheels mounted on the frame at the lower ends of said members so that their peripheries are rearwardly of the rear edges of the members and above but in close proximity to the plane of said lip when the frame is in vertical position.

THOMAS W. YEATS.